US006988701B1

(12) United States Patent
Lin

(10) Patent No.: US 6,988,701 B1
(45) Date of Patent: Jan. 24, 2006

(54) FLAG OR POST SUPPORT DEVICE

(76) Inventor: I-Cheng Lin, P.O. Box 63-298, Taichung (TW) 406

( * ) Notice: Subject to any disclaimer, the term of this patent is extended or adjusted under 35 U.S.C. 154(b) by 0 days.

(21) Appl. No.: 10/911,350

(22) Filed: Aug. 5, 2004

(51) Int. Cl.
*F16M 13/00* (2006.01)

(52) U.S. Cl. ..................................... 248/521; 248/514
(58) Field of Classification Search ............... 248/514, 248/519, 521, 523, 527, 535, 539
See application file for complete search history.

(56) References Cited

U.S. PATENT DOCUMENTS

| | | | | |
|---|---|---|---|---|
| 2,667,317 A | * | 1/1954 | Trebules ..................... | 248/514 |
| 2,733,030 A | * | 1/1956 | Hawthorne ................. | 248/514 |
| 3,162,407 A | * | 12/1964 | Yax ............................. | 248/514 |
| 4,917,343 A | * | 4/1990 | Wainscott ................ | 248/447.2 |
| 5,088,681 A | | 2/1992 | Procaccianti et al. ....... | 248/530 |
| 5,374,024 A | * | 12/1994 | Williams ..................... | 248/514 |
| 5,458,306 A | * | 10/1995 | O'Farrill et al. .......... | 248/188.8 |
| 5,588,630 A | * | 12/1996 | Chen-Chao ................. | 248/514 |
| 5,709,366 A | | 1/1998 | Speece ........................ | 248/530 |
| 6,328,273 B1 | | 12/2001 | Kemikem .................... | 248/530 |

\* cited by examiner

*Primary Examiner*—A. Joseph Wujciak, III
(74) *Attorney, Agent, or Firm*—Charles E. Baxley

(57) ABSTRACT

A flag or post support device includes a base having a bottom plate for securing to supporting surfaces, two flaps extended from the bottom plate and each having a number of teeth formed around an orifice, a seat rotatably received between the flaps and having two blocks rotatably secured to the flaps with a fastener, each of the blocks includes a number of teeth for engaging with the teeth of the flaps, and for adjustably securing the blocks of the seat to the base at selected angular positions. A post includes one end received in the seat, and has a passage to receive the fastener, and to solidly secure the post to the seat and thus to the base, and to prevent the post from being disengaged from the seat and the base.

5 Claims, 8 Drawing Sheets

US 6,988,701 B1

FLAG OR POST SUPPORT DEVICE

BACKGROUND OF THE INVENTION

1. Field of the Invention

The present invention relates to a flag or post support device, and more particularly to a flag or post support device having an angular adjustable structure.

2. Description of the Prior Art

Typical flag or post support devices comprise a ground engaging element for engaging into ground, and a tubular or cylindrical member attached to the ground engaging element, for supporting a post or a rod of a flag or of an umbrella, or the like.

For example, U.S. Pat. No. 5,088,681 to Procaccianti et al., and U.S. Pat. No. 5,709,366 to Speece, and U.S. Pat. No. 6,328,273 to Kemikem disclose three of the typical flag or post support devices each also comprising a tubular or cylindrical member attached to a ground engaging element, for supporting a longitudinal post of a flag or umbrella or antenna or the like.

However, normally, the tubular or cylindrical members are solidly secured to the ground engaging elements, and may not be adjusted relative to the ground engaging elements to different angular positions.

In addition, the longitudinal posts or rods of the flag or umbrella or antenna or the like are simply engaged into the tubular or cylindrical members, and may have a good chance to be disengaged from the tubular or cylindrical members, particularly when the flag or umbrella or antenna are blown by strong wind.

The present invention has arisen to mitigate and/or obviate the afore-described disadvantages of the conventional flag or post support devices.

SUMMARY OF THE INVENTION

The primary objective of the present invention is to provide a flag or post support device including an angular adjustable structure to allow the support device to be adjusted to different angular position relative to the ground or to the supporting surfaces.

The other objective of the present invention is to provide a flag or post support device solidly securable or fixable to the longitudinal posts or rods of the flag or umbrella or antenna or the like, to prevent the longitudinal posts or rods from being disengaged from the support device.

In accordance with one aspect of the invention, there is provided a flag or post support device comprising a base including a bottom plate for securing to supporting surfaces, two flaps extended from the bottom plate and spaced away from each other to form a space between the flaps, each of the flaps including an orifice formed therein and aligned with each other, and a number of teeth provided around the orifice thereof, a securing device including a fastener engaged through the orifices of the flaps, and a lock nut threaded with the fastener, a seat rotatably received in the space formed between the flaps, and including two blocks each having an aperture formed therein to receive the fastener, and to rotatably attach the blocks to the flaps of the base, each of the blocks including a number of teeth formed around the aperture thereof, for engaging with the teeth of the flaps, and for adjustably securing the blocks of the seat to the base at selected angular positions, each of the blocks including a depression formed therein, to form a depression within the seat, and a post including a first end received in the depression of the seat, and having a passage formed therein, to receive the fastener, and to solidly secure the post to the seat and thus to the base, and to prevent the post from being disengaged from the seat and the base. The post is solidly securable between the blocks of the seat and the flaps of the base with the fastener, and adjustably securable to the base at selected angular positions by engagements between the teeth of the flaps and the teeth of the blocks.

A first block of the blocks includes at least one recessed channel formed therein, and a second block of the blocks includes at least one ear extended therefrom, and slidably engaged into the recessed channel of the first block, to guide the blocks to slide relative to each other, and to allow the post to be stably retained between the blocks of the seat.

One of the flaps includes a hexagonal cavity formed therein, the fastener includes an enlarged hexagonal head formed on one end thereof and engaged in the hexagonal cavity of the flap, to anchor the fastener to the flap, and to prevent the fastener from being rotated relative to the flap of the base.

The flap includes a protrusion extended therefrom, and having the hexagonal cavity formed therein, to receive the enlarged hexagonal head of the fastener. The flap includes a reinforcing rib extended therefrom and coupled to the protrusion, to reinforce the flap and the protrusion.

The other flap includes a peripheral flange extended outwardly therefrom to form a circular recess therein, and a washer engaged onto the fastener and received in the circular recess defined in the peripheral flange of the flap.

Further objectives and advantages of the present invention will become apparent from a careful reading of the detailed description provided hereinbelow, with appropriate reference to the accompanying drawings.

DETAILED DESCRIPTION OF THE PREFERRED EMBODIMENT

Figure 1:
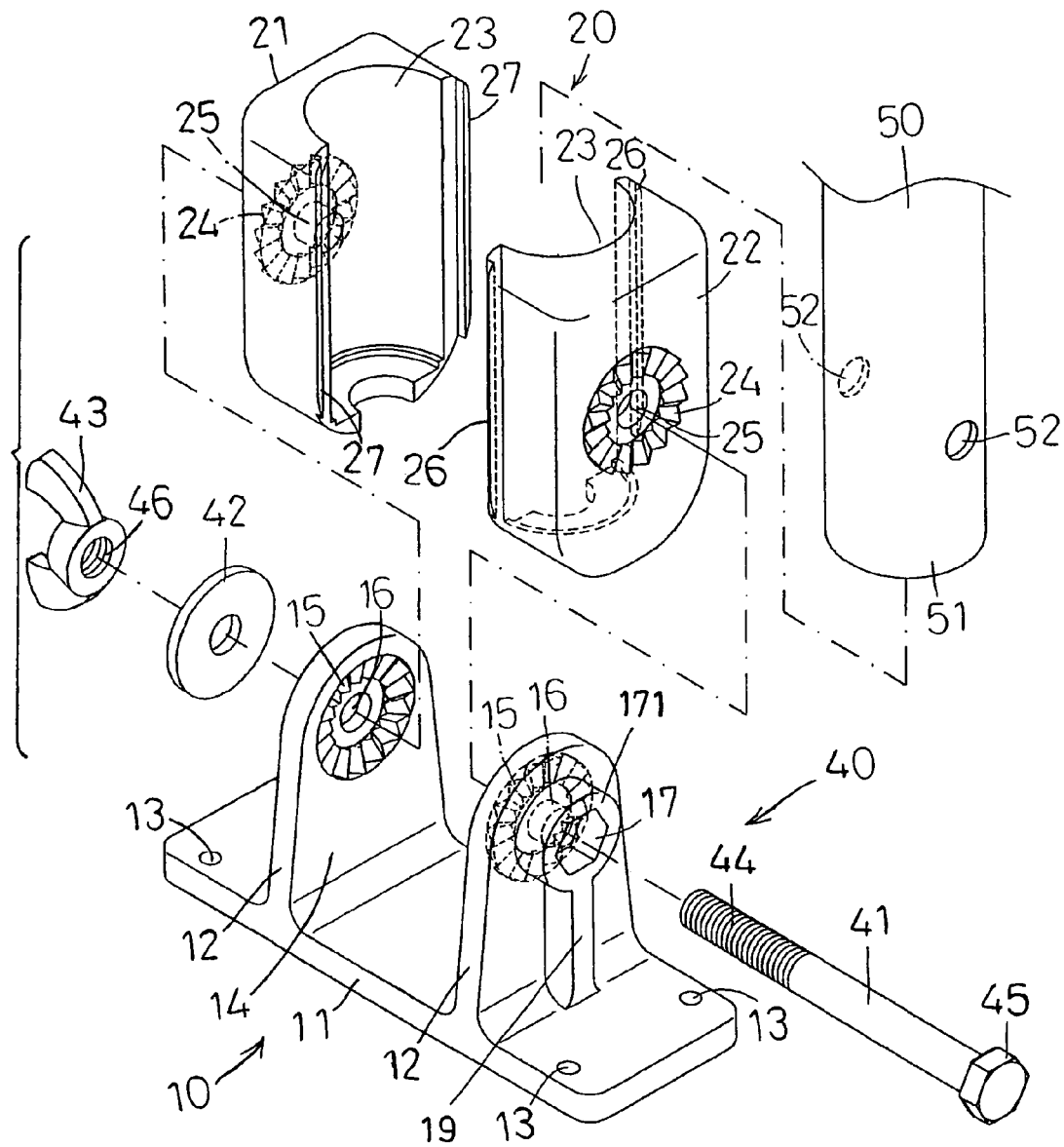
FIG. 1 is an exploded view of a flag or post support device in accordance with the present invention.

Referring to the drawings, and initially to FIGS. 1–6, a flag or post support device 1 in accordance with the present invention comprises a base 10 including a bottom plate 11, two flaps 12 extended upwardly from the bottom plate 11 and spaced away from each other to form or define a space 14 between the flaps 12. The bottom plate 11 includes a number of holes 13 formed therein for receiving fasteners 30 (FIGS. 7–9) which may secure the base 10 to ground or various supporting walls or surfaces 90.

Figure 3:
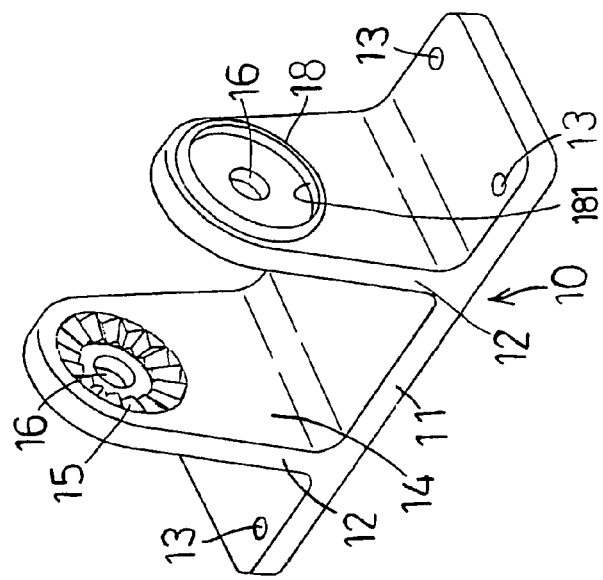
FIG. 3 is a perspective view showing a base of the flag or post support device.

Each of the flaps 12 includes an orifice 16 formed therein and aligned with each other for receiving a bolt or fastener 41 of a securing device 40, and a serrated surface or a number of teeth 15 formed or provided around the orifice 16 thereof. One of the flaps 12 includes a hexagonal cavity 17 formed therein and defined by a protrusion 171 that is extended out from the flap 12, and the other flap 12 includes a peripheral flange 18 extended outwardly therefrom to form a circular recess 181 therein (FIG. 3).

The fastener 41 of the securing device 40 is engaged through the orifices 16 of the flaps 12, and includes an enlarged or hexagonal head 45 formed on one end thereof and engaged in the corresponding hexagonal cavity 17 of the flap 12, to anchor the fastener 41 to the flap 12, and to prevent the fastener 41 from being rotated relative to the flap 12 of the base 10. The fastener 41 of the securing device 40 includes an outer thread 44 formed in the other end thereof and threaded with an inner thread 46 of a wing nut or lock nut 43.

A washer 42 may be engaged onto the fastener 41 of the securing device 40, and may be received in the circular recess 181 defined in the peripheral flange 18 of the flap 12. It is preferable that the flaps 12 include a suitable flexibility or resilience, to allow the flaps 12 to be slightly forced toward each other by the fastener 41. It is further preferable that the base 10 includes one or more reinforcing ribs 19 extended therefrom and coupled between the flap 12 and/or the protrusion 171 and/or the base 10, to reinforce the flap 12 or the protrusion 171 or the base 10 or the like.

Figure 6:
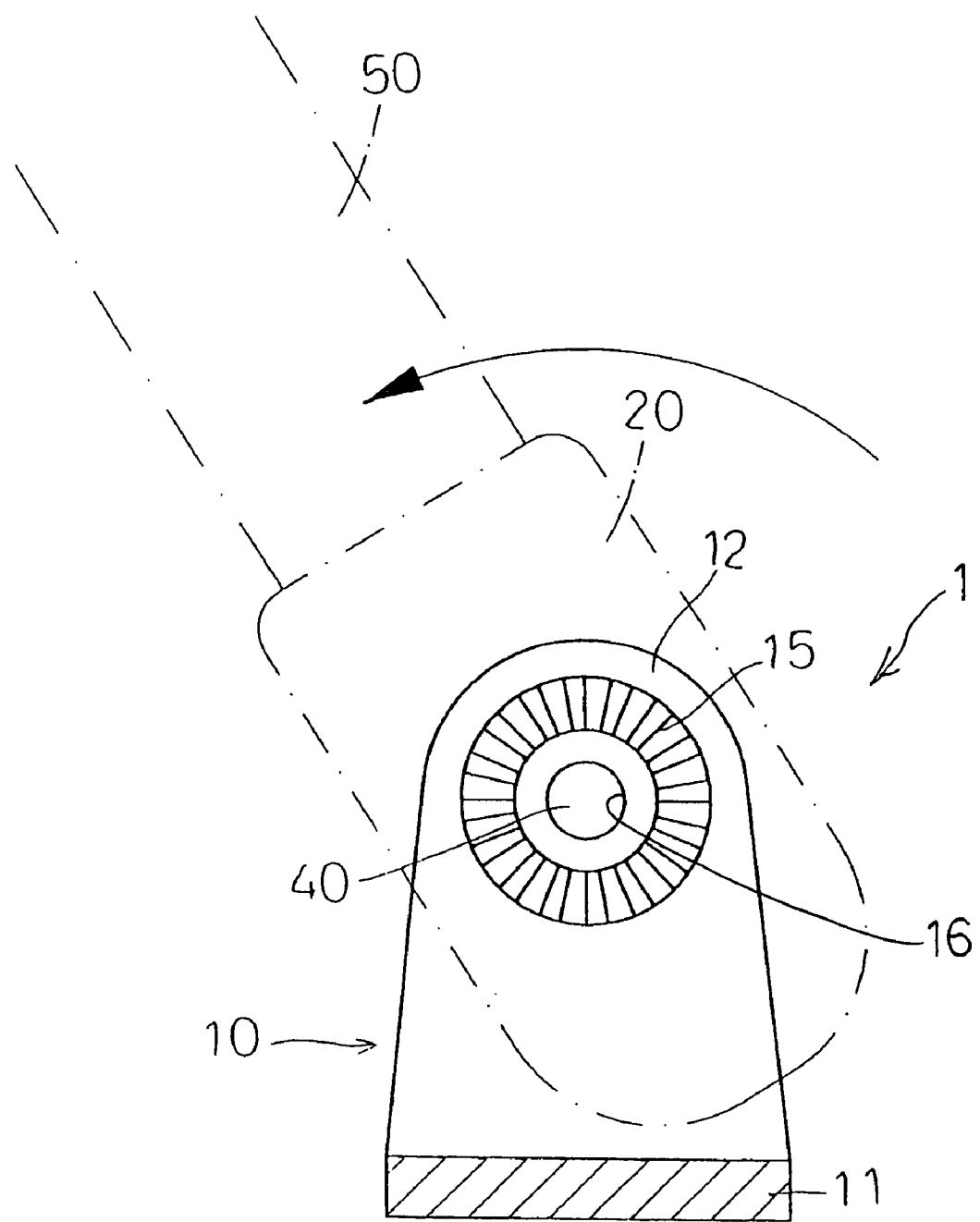

The support device 1 further includes a seat 20 rotatably received in the space 14 formed or defined between the flaps 12. For example, the seat 20 includes two blocks 21, 22 each having an aperture 25 formed therein to receive the fastener 41, and to rotatably attach the blocks 21, 22 to the flaps 12 of the base 10. Each of the blocks 21, 22 includes a serrated surface or a number of teeth 24 formed or provided around the aperture 25 thereof, for engaging with the teeth 15 of the flaps 12, and for adjustably securing the blocks 21, 22 of the seat 20 to the base 10 at any selected angular positions (FIG. 6).

Each of the blocks 21, 22 includes a semi-cylindrical depression 23 formed therein, to form a cylindrical depression 23 within the seat 20, and for receiving one end 51 of a longitudinal rod or post 50. The post 50 also includes a passage 52 laterally formed through the end portion 51 thereof, to receive the fastener 41 of the securing device 40, and thus to solidly secure the post 50 to the seat 20 and the base 10, and to prevent the post 50 from being disengaged from the seat 20 and the base 10.

Figure 2:
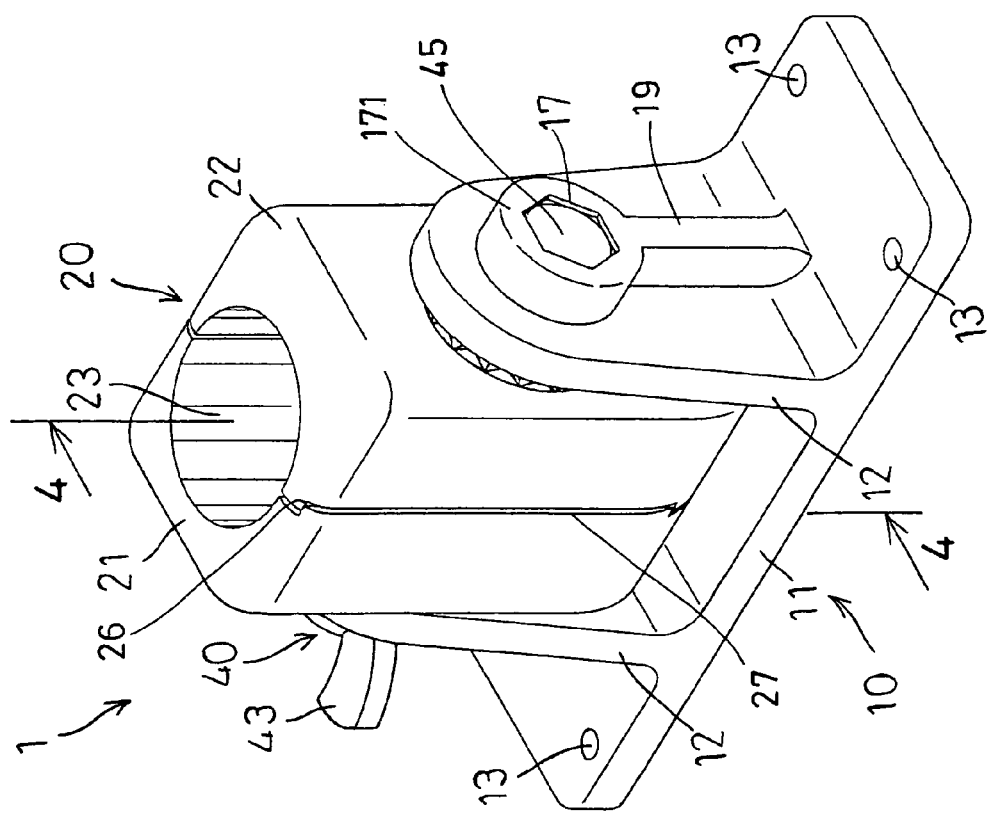
FIG. 2 is a perspective view of the flag or post support device.
Figure 4:
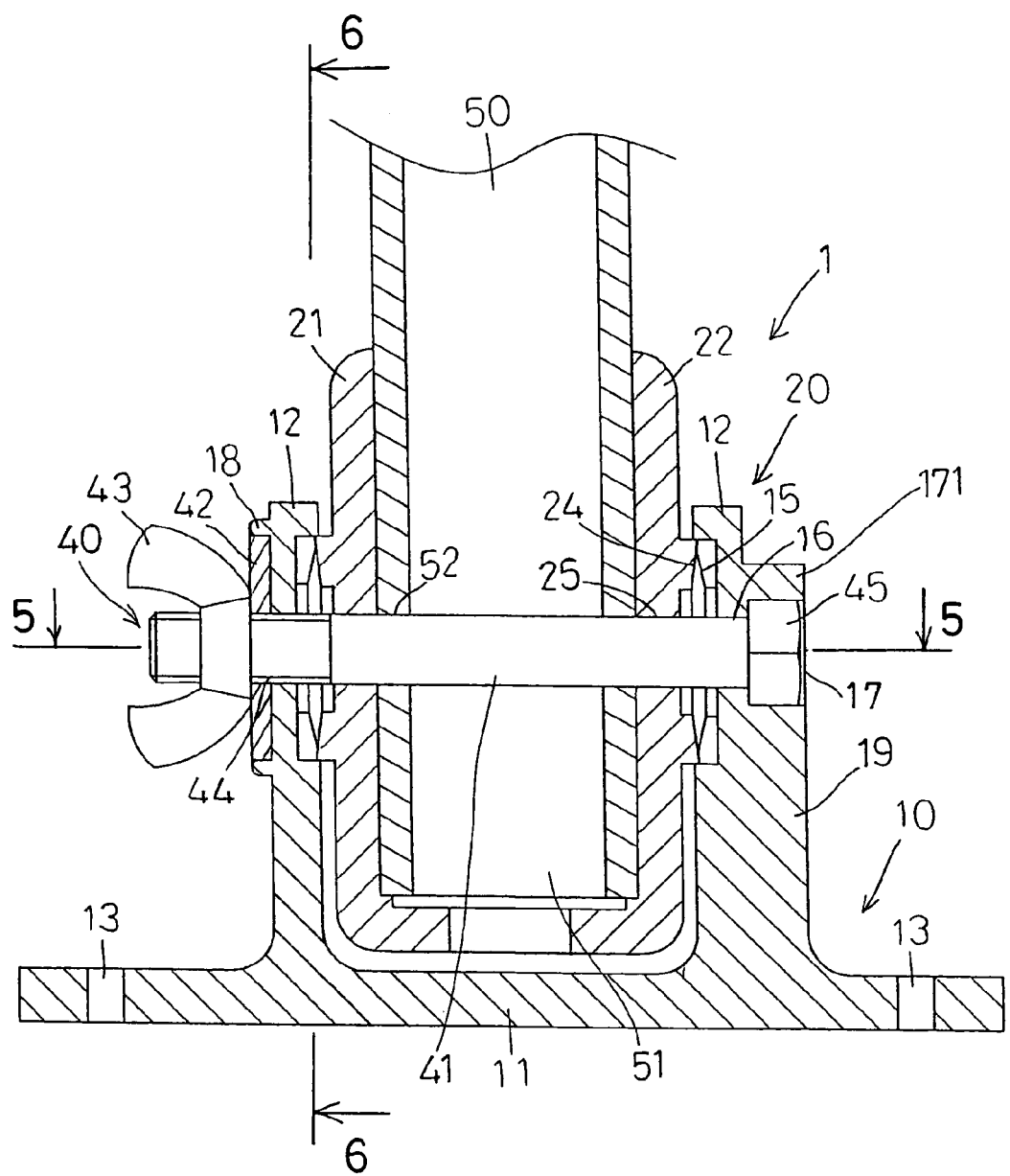
FIG. 4 is a partial cross sectional view taken along lines 4—4 of FIG. 2.
Figure 5:
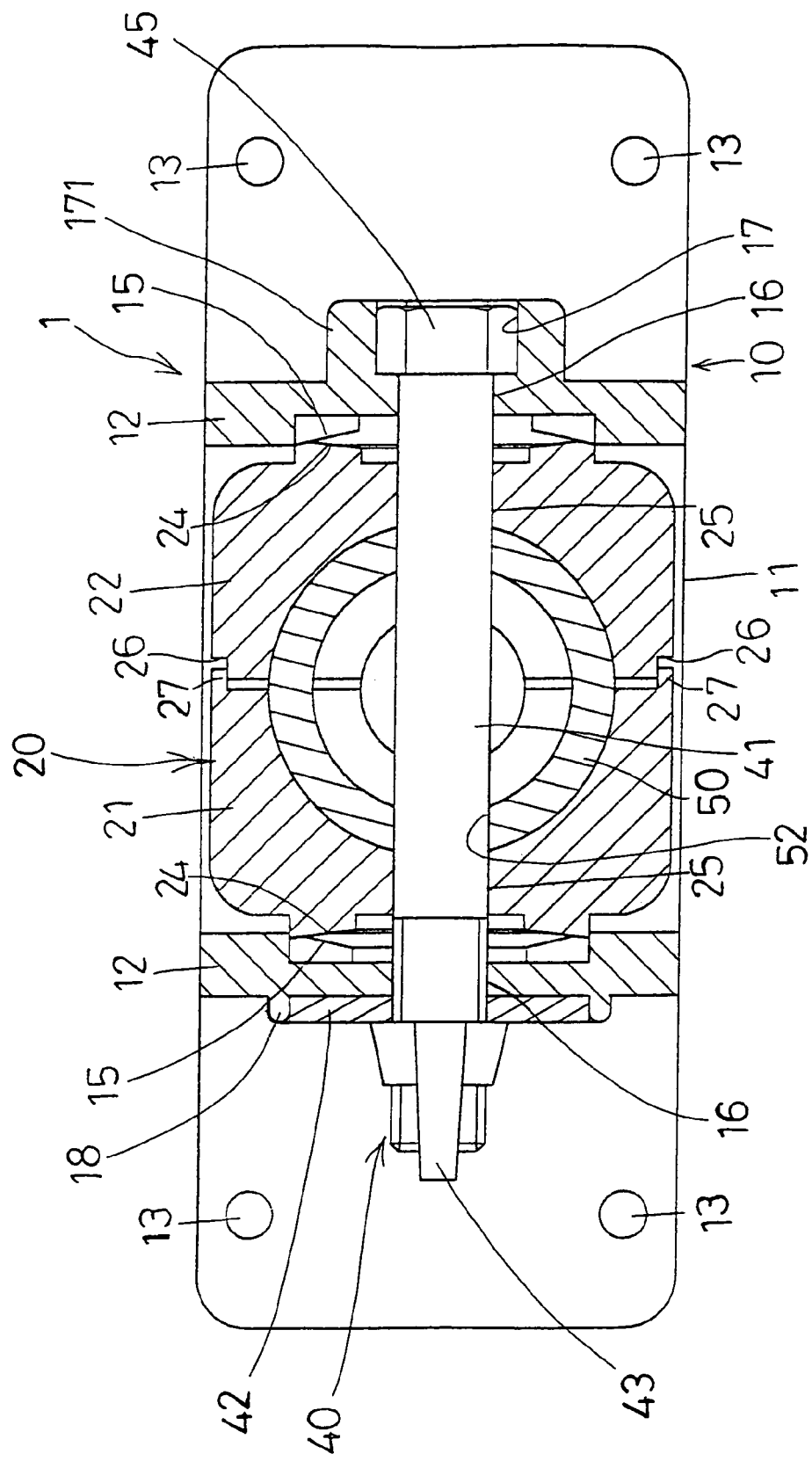
FIGS. 5, 6 are partial cross sectional views taken along lines 5—5, and 6—6 of FIG. 4 respectively.

As best shown in FIGS. 1, 2 and 5, one of the blocks 22 includes one or more, such as two recessed channels 26 formed therein, and the other block 21 includes one or more, such as two ears 27 extended therefrom, and slidably engaged into the recessed channels 26 of the block 22, to guide the blocks 21, 22 to slide or to move relative to each other, and to allow posts 50 of different diameter to be engaged and retained in the cylindrical depression 23 formed or defined within the blocks 21, 22 of the seat 20.

In operation, as shown in FIGS. 2 and 4–6, the posts 50 of different diameters may be engaged and retained in the blocks 21, 22 of the seat 20, and may be solidly secured to the flaps 12 of the base 10 with the fastener 41, in which the fastener 41 is engaged through the flaps 12 and the blocks 21, 22 and the post 50. In addition, the teeth 24 of the blocks 21, 22 may be engaged with the teeth 15 of the flaps 12, to adjustably secure or retain the blocks 21, 22 of the seat 20 to the base 10 at any selected angular positions.

Figure 7:
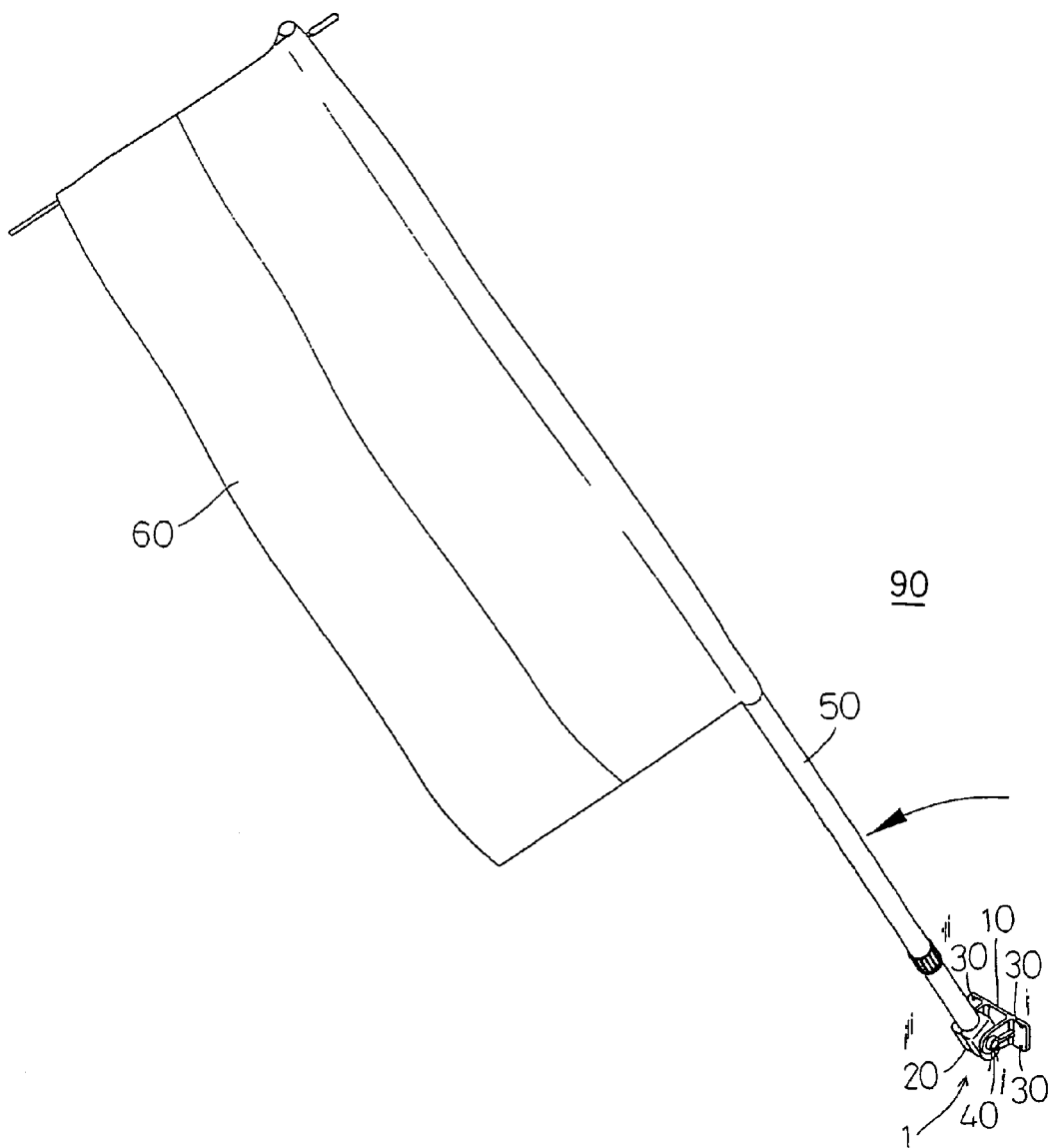
FIGS. 7, 8, 9 are perspective views illustrating the operation of the flag or post support device.
Figure 8:
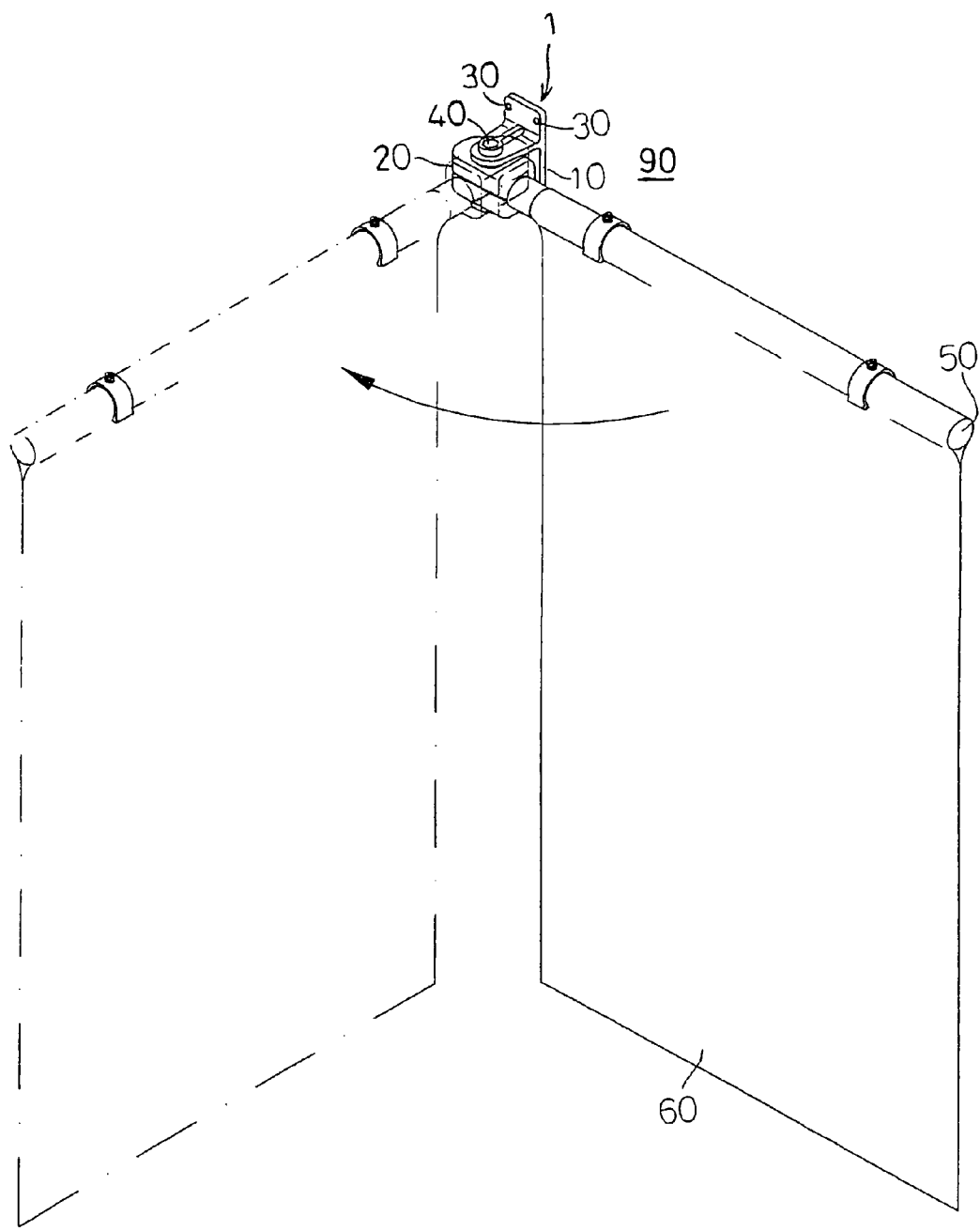
Figure 9:
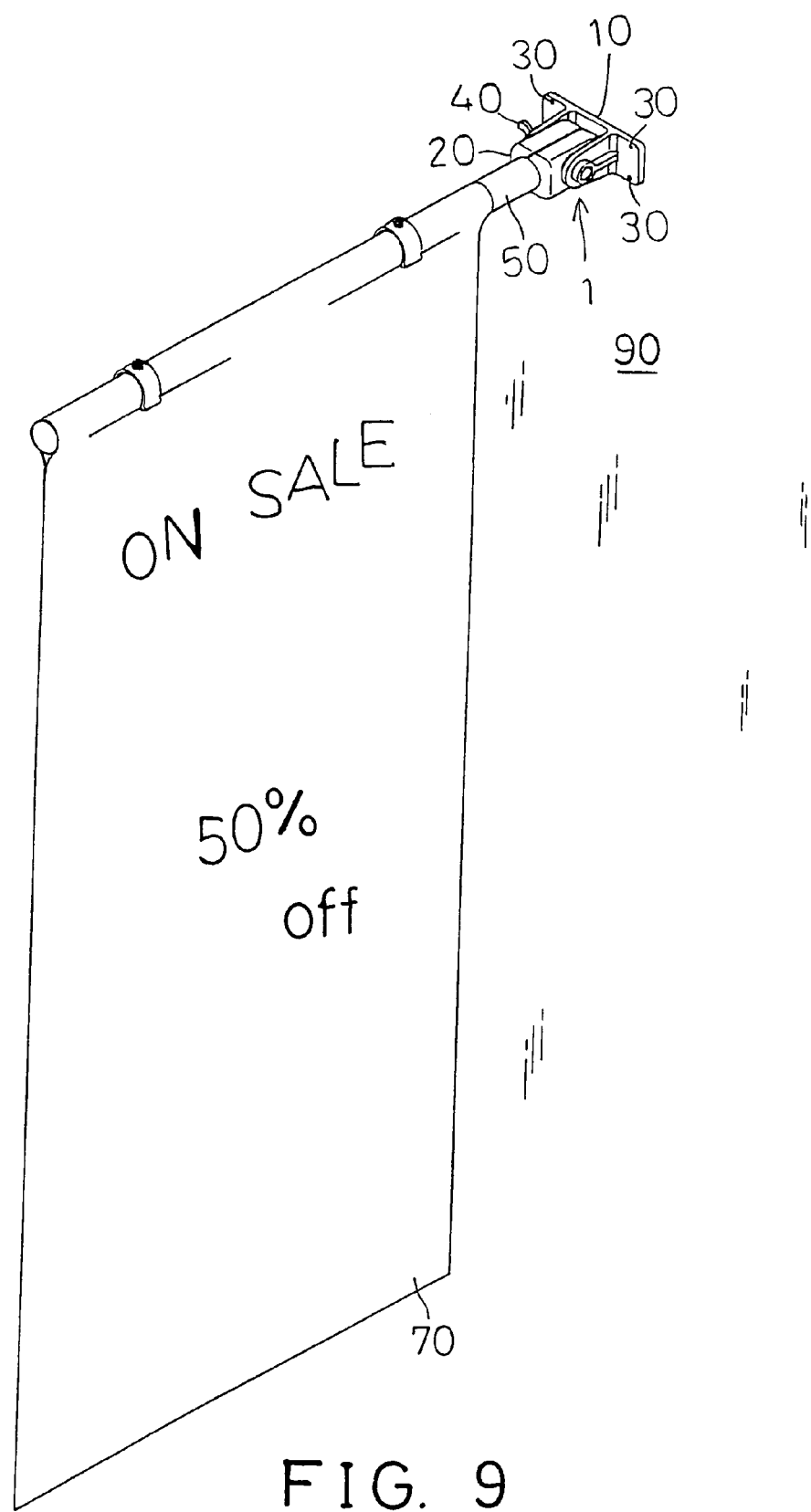

As shown in FIGS. 7–9, flags 60 or umbrella or antenna or other objects may be attached onto the post 50, for rotatably attaching to the supporting surface 90 with the support device 1. The post 50 will not be disengaged from the seat 20 and the base 10, because the fastener 41 is engaged through the flaps 12 and the blocks 21, 22 and the post 50, to solidly secure the flaps 12 of the base 10 and the blocks 21, 22 of the seat 20 and the post 50 together.

Accordingly, the flag or post support device includes an angular adjustable structure to allow the support device to be adjusted to different angular position relative to the ground or to the supporting surfaces, and includes a solidly securing structure solidly securable or fixable to the longitudinal posts or rods of the flag or umbrella or antenna or the like, to prevent the longitudinal posts or rods from being disengaged from the support device.

Although this invention has been described with a certain degree of particularity, it is to be understood that the present disclosure has been made by way of example only and that numerous changes in the detailed construction and the combination and arrangement of parts may be resorted to without departing from the spirit and scope of the invention as hereinafter claimed.

I claim:

1. A support device comprising:
   a base including a bottom plate for securing to supporting surfaces, two flaps extended from said bottom plate and spaced away from each other to form a space between said flaps,
   each of said flaps including an orifice formed therein and aligned with each other, and a plurality of teeth provided around said orifice thereof,
   a securing device including a fastener engaged through said orifices of said flaps, and a lock nut threaded with said fastener,
   a seat rotatably received in said space formed between said flaps, and including two blocks each having an aperture formed therein to receive said fastener, and to rotatably attach said blocks to said flaps of said base, each of said blocks including a plurality of teeth formed around said aperture thereof, for engaging with said teeth of said flaps, and for adjustably securing said blocks of said seat to said base at selected angular positions,
   each of said blocks including a depression formed therein, to form a depression within said seat, and
   a post including a first end received in said depression of said seat, and having a passage formed therein, to receive said fastener, and to solidly secure said post to said seat and thus to said base, and to prevent said post from being disengaged from said seat and said base,
   said post being solidly securable between said blocks of said seat and said flaps of said base with said fastener, and adjustably securable to said base at selected angular positions by engagements between said teeth of said flaps and said teeth of said blocks, and
   a first block of said blocks including at least one recessed channel formed therein, and a second block of said blocks including at least one ear extended therefrom, and slidably engaged into said at least one recessed channel of said first block, to guide said blocks to slide relative to each other, and to allow said post to be stably retained between said blocks of said seat.

2. The support device as claimed in claim 1, wherein a first flap of said flaps includes a peripheral flange extended outwardly therefrom to form a circular recess therein, and a washer engaged onto said fastener and received in said circular recess defined in said peripheral flange of said flap.

3. A support device comprising:
   a base including a bottom plate for securing to supporting surfaces, two flaps extended from said bottom plate and spaced away from each other to form a space between said flaps, each of said flaps including an orifice formed therein and aligned with each other, and a plurality of teeth provided around said orifice thereof, a securing device including a fastener engaged through said orifices of said flaps, and a lock nut threaded with said fastener, a seat rotatably received in said space formed between said flaps, and including two blocks each having an aperture formed therein to receive said fastener, and to rotatably attach said blocks to said flaps of said base, each of said blocks including a plurality of teeth formed around said aperture thereof, for engaging with said teeth of said flaps, and for adjustably securing said blocks of said seat to said base at selected angular positions, each of said blocks including a depression formed therein, to form a depression within said seat, and a post including a first end received in said depression of said seat, and having a passage formed therein, to receive said fastener, and to solidly secure said post to said seat and thus to said base, and to prevent said post from being disengaged from said seat and said base, said post being solidly securable between said blocks of said seat and said flaps of said base with said fastener, and adjustable securable to said base at selected angular positions by engagements between said teeth of said flaps and said teeth of said blocks, and a first flap of said flaps including a hexagonal cavity formed therein, said fastener including an enlarged hexagonal head formed on one end thereof and engaged in said hexagonal cavity of said first flap, to anchor said fastener to said first flap, and to prevent said fastener from being rotated relative to said first flap of said base.

4. The support device as claimed in claim 3, wherein said first flap includes a protrusion extended therefrom, and having said hexagonal cavity formed therein, to receive said enlarged hexagonal head of said fastener.

5. The support device as claimed in claim 4, wherein said first flap includes a reinforcing rib extended therefrom and coupled to said protrusion, to reinforce said flap and said protrusion.

* * * * *